United States Patent
Schuetz

(10) Patent No.: US 7,841,616 B2
(45) Date of Patent: Nov. 30, 2010

(54) VEHICLE STEERING WHEEL

(75) Inventor: Dominik Schuetz, Waldaschaff (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 299 days.

(21) Appl. No.: 11/897,134

(22) Filed: Aug. 29, 2007

(65) Prior Publication Data
US 2008/0060469 A1 Mar. 13, 2008

(30) Foreign Application Priority Data
Sep. 13, 2006 (DE) .................. 20 2006 014 054 U

(51) Int. Cl.
*B60R 21/20* (2006.01)
*B60R 21/203* (2006.01)
(52) U.S. Cl. ................. 280/728.2; 280/731; 280/743.1; 200/61.54; 200/61.55
(58) Field of Classification Search .............. 280/728.2, 280/731, 743.1, 61.54, 61.55; 200/61.55, 200/61.54
See application file for complete search history.

(56) References Cited

U.S. PATENT DOCUMENTS

| | | | |
|---|---|---|---|
| 6,422,602 B1 * | 7/2002 | Ishii et al. ................. | 280/743.1 |
| 6,672,613 B2 | 1/2004 | Schuler | |
| 6,682,092 B2 | 1/2004 | Schutz et al. | |
| 7,053,322 B2 | 5/2006 | Helmstetter et al. | |
| 2004/0090051 A1 * | 5/2004 | Schutz ........................ | 280/731 |
| 2005/0098992 A1 | 5/2005 | Yamada et al. | |
| 2005/0194766 A1 * | 9/2005 | Jones et al. ............... | 280/728.2 |
| 2005/0280250 A1 | 12/2005 | Hirzmann | |
| 2006/0113775 A1 * | 6/2006 | Hirzmann et al. ........... | 280/731 |
| 2007/0138771 A1 * | 6/2007 | Schuetz ................... | 280/728.2 |

FOREIGN PATENT DOCUMENTS

DE  20006595  9/2000

(Continued)

OTHER PUBLICATIONS

2001 Chrysler PT Cruiser Steering Wheel, Driver Airbag and relevant trim pieces. (Photo).*

*Primary Examiner*—Paul N. Dickson
*Assistant Examiner*—Barry Gooden, Jr.
(74) *Attorney, Agent, or Firm*—Tarolli, Sundheim, Covell & Tummino LLP

(57) ABSTRACT

A vehicle steering wheel being rotatable around a steering wheel axis (A), includes a steering wheel hub (38), a receiving part (12) configured as a separate, prefabricated component and an airbag module (13) with a generator carrier (10), the generator carrier (10) being inserted into the receiving part (12), the receiving part (12) and the generator carrier (10) being made of plastic.

The invention also includes a vehicle steering wheel being rotatable around a steering wheel axis (A), having a steering wheel hub (38), a receiving part (12), and an airbag module (13) with a generator carrier (10), the generator carrier (10) being inserted into the receiving part (12). The generator carrier (10) is accommodated in and guided by the receiving part (12) so as to be axially movable, at least one of the generator carrier (10) and the receiving part (12) having axially offset bearing projections (26), the bearing projections (26) adjoining at least one of the receiving part (12) and the generator carrier (10), and the bearing projections (26) providing an axial guidance.

23 Claims, 2 Drawing Sheets

FOREIGN PATENT DOCUMENTS

| DE | 20021532 | 5/2001 |
| DE | 202004009568 | 12/2004 |
| DE | 202004012964 | 1/2005 |
| DE | 20 2005020 078 | * 3/2006 |
| DE | 202004018362 | 5/2006 |

* cited by examiner

VEHICLE STEERING WHEEL

TECHNICAL FIELD

The invention relates to a vehicle steering wheel being rotatable around a steering wheel axis, including a steering wheel hub, a receiving part configured as a separate, prefabricated component and an airbag module with a generator carrier, said generator carrier being inserted into the receiving part.

BACKGROUND OF THE INVENTION

Such vehicle steering wheels are known from the state of the art, and they are often configured such that the airbag module can move in an axial direction. Such float-mounted airbag modules, which take over the function of a horn actuation element, are also referred to as floating-horn modules. In contrast to horn pushbuttons arranged on the steering wheel, they have the advantage that the airbag module always assumes a centered position, regardless of the motion of the steering wheel, so that the horn actuation in hazardous situations is simplified. As a rule, the airbag module can be moved downwards against the force of compression springs to such an extent that a horn contact provided in the vehicle steering wheel is closed by pushing down the airbag module.

A vehicle steering wheel of this type is disclosed, for example, in German utility model DE 20 2004 018 362 U1 in which an airbag module is accommodated in a cylindrical outer jacket of a receptacle so as to be axially movable. Guide elements are provided on an axial edge of the outer jacket for purposes of guiding the airbag module. The stroke of the airbag module is limited by stops in both axial directions, and these stops also prevent the airbag module from rotating in the outer jacket.

Another vehicle steering wheel according to the preamble of Claim 1 is described in German utility model DE 200 06 595 U1, in which an airbag module is inserted into a receiving part so as to be axially movable. The essentially cylindrical airbag module is guided along a likewise essentially cylindrical inside of the receiving part. A guide groove that runs axially can be provided in a circumferential wall of the receiving part, said guide groove securing the airbag module along its circumferential course in the receiving part. A relatively high friction occurs due to the large surfaces of the cylindrical walls of the airbag module and the receiving part sliding along each other when the airbag module is moved.

The object of the invention is to create a vehicle steering wheel whose design is simple and whose production is as inexpensive as possible. In particular, when this vehicle steering wheel is designed with a floating-horn airbag module, it should allow the horn to be actuated as smoothly as possible and should ensure a very precise axial movement of the airbag module, that is to say, it should largely prevent the airbag module from tilting if the horn is actuated off-center.

BRIEF SUMMARY OF THE INVENTION

According to the invention, this is achieved by a vehicle steering wheel being rotatable around a steering wheel axis (A), that includes a steering wheel hub, a receiving part configured as a separate, prefabricated component and an airbag module with a generator carrier, the generator carrier being inserted into the receiving part, the receiving part and the generator carrier being made of plastic. By manufacturing these components out of plastic, the material costs as well as the work involved in shaping the components are reduced in comparison to metal components and moreover, low compressions are possible and the expansions of the parts under heat are the same.

In a preferred embodiment, the generator carrier is accommodated in and guided by the receiving part so as to be axially movable. Hence, the above-mentioned reduction of the material costs and of the work involved can also be achieved for the widespread vehicle steering wheels employing floating-horn airbag modules.

The envisaged object is also achieved by a vehicle steering wheel including a steering wheel hub, a receiving part and an airbag module that has a generator carrier being inserted into the receiving part, the receiving part being preferably configured as a separate, prefabricated component. The generator carrier is accommodated in and guided by the receiving part so as to be axially movable, at least one of the generator carrier and the receiving part having axially offset bearing projections, the bearing projections adjoining at least one of the receiving part and the generator carrier, and the bearing projections providing an axial guidance. Axially offset bearing projections on the generator carrier and/or on the receiving part can easily be formed and, at the same time, these bearing projections constitute a good sliding guidance for the generator carrier inside the receiving part. Since the bearing projections are arranged so as to be axially offset, tilting of the generator carrier inside the receiving part is largely ruled out if the horn is actuated off-center.

Preferably, the bearing projections are integrally formed onto at least one of the generator carrier and the receiving part. Particularly when the generator carrier or receiving part are made of plastic, the bearing projections can be integrally formed with great ease. The work step of attaching separate bearing projections is eliminated and the number of individual components for the vehicle steering wheel according to the invention is minimized.

The bearing projections can be arranged especially in the area of axial ends of at least one of the generator carrier and the receiving part. Through this arrangement of the bearing projections at the greatest possible distance in the axial direction, tilting of the generator carrier in the receiving part is prevented particularly effectively.

In one embodiment, the bearing projections are arranged so as to be distributed along one of an outer circumference of the generator carrier and an inner circumference of the receiving part.

Especially advantageously, at least one of the generator carrier and the receiving part in this embodiment has at least three bearing projections being offset relative to a circumferential direction. With these at least three bearing projections, which are arranged so as to be distributed along an outer circumference of the generator carrier or an inner circumference of the receiving part, the position of the generator carrier can be fixed inside the receiving part crosswise to the steering wheel axis.

Preferably, the axial guidance of the generator carrier in the receiving part takes place exclusively by the help of the axially offset bearing projections. By affixing the position and guiding the generator carrier in the receiving part exclusively by means of the bearing projections, the contact surface between the generator carrier and the receiving part is minimized. Thanks to this minimized contact surface, the generator carrier can slide in the receiving part with little friction resistance, thus ensuring that the horn can be actuated or released smoothly.

In another embodiment, axial grooves are formed in one of the generator carrier and the receiving part, the bearing projections engaging in these grooves and being able to slide in these grooves. If the generator carrier or receiving part is configured so as to be essentially cylindrical, then this step prevents the generator carrier from rotating around a shared longitudinal axis B relative to the receiving part. Consequently, the interacting bearing projections and grooves position the generator carrier with respect to the circumferential course in the receiving part.

In one embodiment, the generator carrier is configured as a pot-shaped module housing. The work step of attaching a separate generator carrier to a module housing is thus eliminated and moreover, the number of individual components of the vehicle steering wheel according to the invention is further reduced.

In this embodiment, the generator carrier preferably has a base to which a gas generator is attached, the gas generator extending through an opening in the base. In this embodiment, the gas generator can be mounted from outside of the pot-shaped generator carrier and can be attached with simple means. Whether the folded airbag package was already placed into the pot-shaped generator carrier at the time of the assembly of the gas generator or whether it is placed there subsequently is immaterial.

In a preferred embodiment of the vehicle steering wheel, a spring is provided that pushes the generator carrier into a basic position relative to the receiving part. This spring ensures that the airbag module functions according to the floating horn principle. Since tilting of the generator carrier in the receiving part is largely ruled out by the bearing projections, the generator carrier undergoes the same axial movement in each point when the horn is actuated, so that, especially preferably, one single spring is sufficient to move the generator carrier back into the basic position after the horn has been actuated. In a few embodiment variants, the spring can be integrally formed, for example as a resilient tongue, on the generator carrier or on the receiving part. Of course, it is also possible to provide a plurality of springs that push the generator carrier into its basic position.

The generator carrier and the receiving part can provide at least one contact element each, the contact elements being at a distance from each other in the basic position and being in contact with each other after an axial movement of the generator carrier relative to the receiving part against a force of the spring. In this process, a horn signal is triggered by the contact elements that are in contact with each other.

In another embodiment, the receiving part is firmly joined to the steering wheel hub so that, when the steering wheel turns, the receiving part and the airbag module rotate together with the steering wheel and the steering wheel hub. Here, the receiving part can be joined either directly or indirectly to the steering wheel hub. If it is joined directly, the receiving part is mounted directly, for example screwed, onto the steering wheel hub, whereas if it is joined indirectly, a panel is provided, for example on a side of the receiving part facing away from the steering wheel hub, and this panel is attached to the steering wheel, thereby creating a connection to the steering wheel hub.

As an alternative for attaching the receiving part to the steering wheel hub, embodiments are conceivable in which the receiving part and thus also the airbag module are in a fixed position relative to the vehicle, that is to say, they are arranged so that they do not turn along with the steering wheel. In these cases, the receiving part is not attached directly to the steering wheel hub or to the steering wheel but rather, for instance, coupled via a gear or a bearing to the steering wheel hub or to the steering wheel.

If the receiving part is attached directly to the steering wheel hub by attachment elements, the receiving part can have recesses for receiving the attachment elements.

These recesses are preferably accessible from inside the receiving part. Owing to these measures, a "concealed" attachment of the receiving part to the steering wheel hub is very easily possible without the attachment elements being visible later in the completely installed vehicle steering wheel.

Preferably, the receiving part has a contact surface which runs obliquely inwards in a direction to the base of the receiving part, the receiving part lying against a slanted counter-surface of the steering wheel hub via this contact surface. As a result of this contact surface and counter-surface, the receiving part is oriented and centered in the circumferential direction relative to the steering wheel hub such that the recesses in the receiving part for receiving attachment means are already positioned in alignment with the provided attachment points on the steering wheel hub.

DETAILED DESCRIPTION OF THE PREFERRED EMBODIMENTS

Figure 1:
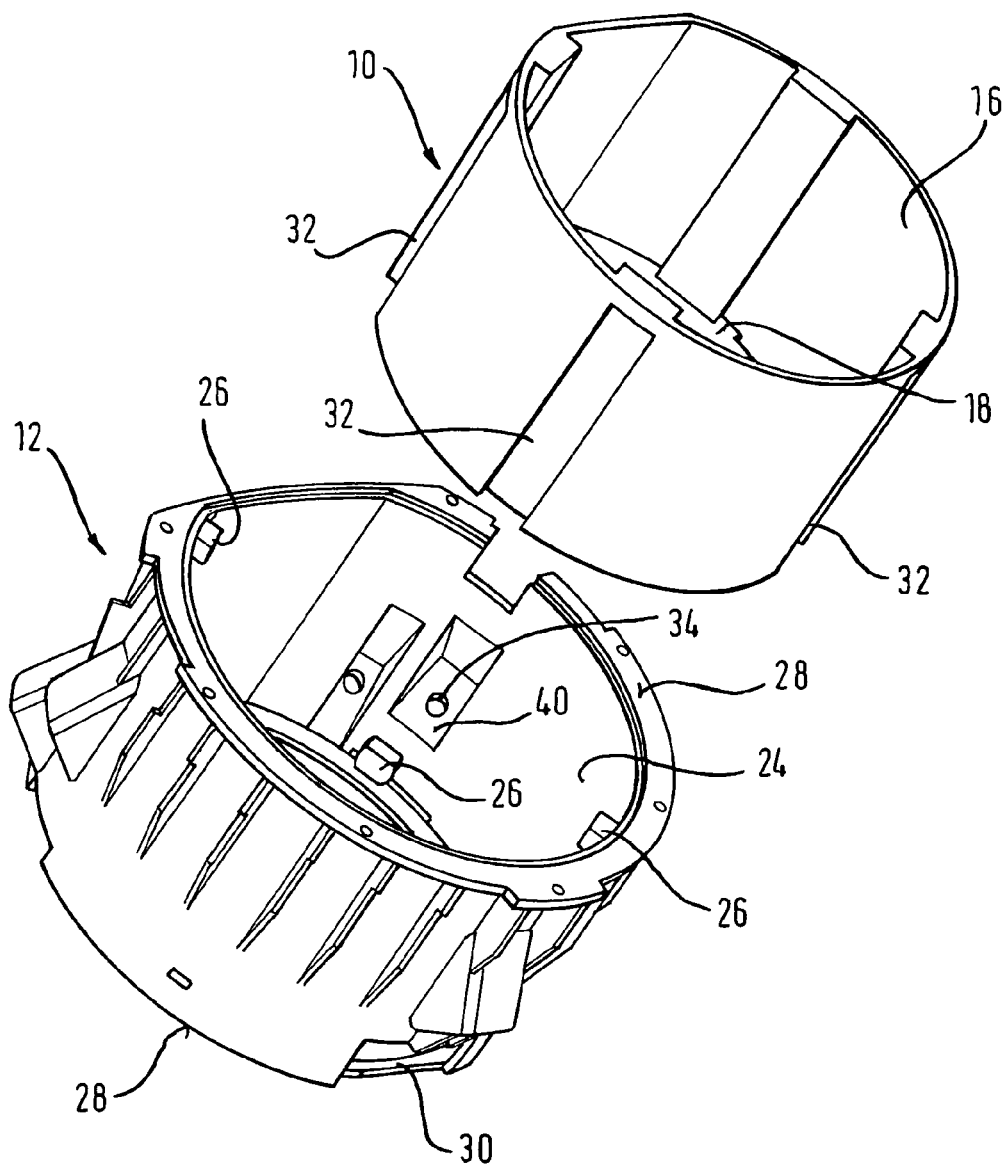
FIG. 1 shows a perspective exploded view of a generator carrier and a receiving part of a vehicle steering wheel according to the invention.

FIG. 1 shows a generator carrier 10 and a receiving part 12, configured as a separate, prefabricated component, the generator carrier 10 as well as the receiving part 12 being made of plastic.

Figure 2:
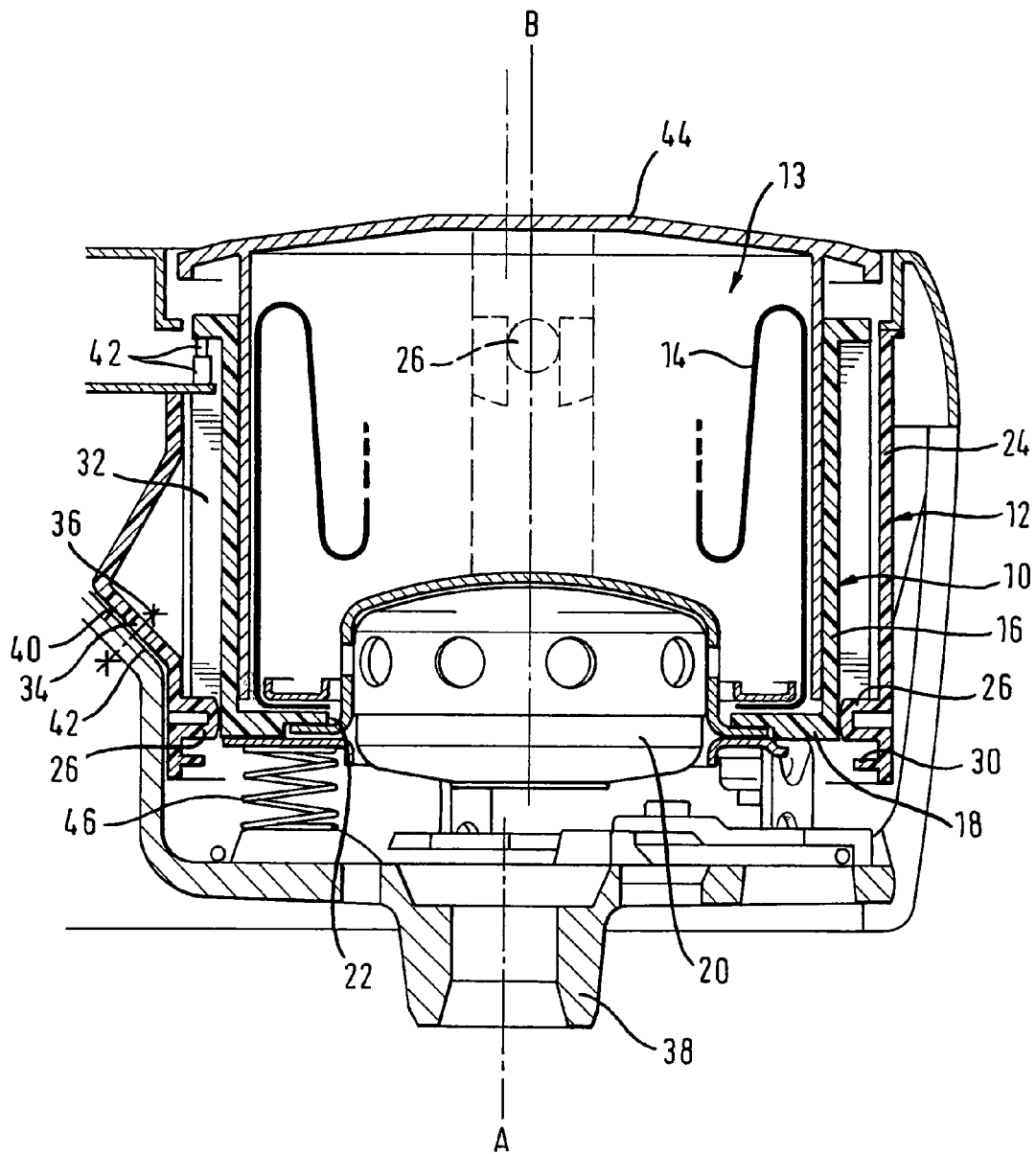
FIG. 2 shows a sectional view through a hub area of a vehicle steering wheel according to the invention.

In the present case, the generator carrier 10 is configured as a pot-shaped module housing of an airbag module 13 that can hold a folded airbag 14 (see FIG. 2). The pot-shaped generator carrier 10 has an essentially cylindrical circumferential wall 16 and a base 18, a gas generator 20 being attached to the base 18 and extending through an opening 22 in the base 18. FIG. 2 clearly shows that the gas generator 20 can be mounted from outside the pot-shaped generator carrier 10 onto the base 18 (that is to say, from below in FIG. 2).

The receiving part 12 shown in FIG. 1 is likewise configured to be largely cylindrical so that the generator carrier 10 is held in the receiving part 12 such that it can be moved axially and such that it can be guided by the receiving part 12. On the inside of a circumferential wall 24, the receiving part 12 has several axially offset bearing projections 26 that, in the installed state, lie against the generator carrier 10 and form an axial guidance (also see FIG. 2). In the present example, the bearing projections 26 extend in the radial direction and are integrally formed onto the plastic generator carrier 10, the bearing projections 26 being arranged in an area of axial ends 28 of the receiving part 12. A base 30 of the receiving part 12 is indicated at one of the axial ends 28.

On the outside of the circumferential wall 16 of the generator carrier 10, axially oriented grooves 32 are formed into which the bearing projections 26 engage in the assembled state of the vehicle steering wheel (FIG. 2), the bearing projections 26 being able to slide in these grooves 32. In the example shown, four bearing projections 26 and grooves 32 are provided which are distributed alternately at the axial ends uniformly, that is to say by 90°, along an outer circumference of the generator carrier 10 and an inner circumference of the receiving part 12, respectively. The generator carrier 10 is guided in the receiving part 12 exclusively by the help of the axially and circumferentially offset bearing projections 26. As a result, the contact surface between the generator carrier 10 and the receiving part 12 is limited to the sum of the individual contact surfaces of the bearing projections 26 so that only a small amount of friction occurs when the generator carrier 10 moves axially relative to the receiving part 12. Moreover, jamming or sticking is ruled out.

In FIGS. 1 and 2, recesses 34 can be seen on the receiving part 12 and they serve to hold attachment elements 36 by means of which the receiving part 12 is attached to a steering wheel hub 38 made of metal, especially made of a cast material, and the recesses are accessible from inside the pot-shaped receiving part 12. In the present example, the receiving part 12 has contact surfaces 40 which run obliquely inwards in a direction to the base 30, the receiving part 12 lying against slanted counter-surfaces 42 of the steering wheel hub 38 via these contact surfaces.

During the assembly of the vehicle steering wheel, first of all, the receiving part 12 is placed onto the steering wheel hub 38 and it is oriented in the circumferential direction relative to the steering wheel hub 38 by means of the slanted contact surfaces 40 and counter-surfaces 42. By means of the recesses 34, the receiving part 12 is then affixed by attachment elements 36 to the steering wheel hub 38, the attachment elements 36 being accessible from inside, so that later on, they are no longer visible from the outside in the completely installed vehicle steering wheel.

Finally, the pre-assembled airbag module 13, which includes the pot-shaped generator carrier 10 (which simultaneously forms the module housing), the gas generator 20, the folded airbag 14 and a module cover 44, is placed into the receiving part 12.

The completely assembled state of the vehicle steering wheel can be seen in the sectional view according to FIG. 2. The vehicle steering wheel in FIG. 2 is in a basic position, a spring 46 being provided that pushes the generator carrier 10 relative to the receiving part 12 into this basic position. Due to axial pressure on the module cover 44, the airbag module 13, especially the generator carrier 10, can be moved relative to the receiving part 12 against the spring force (downwards in FIG. 2). As a result of this movement, contact elements 48 that are provided on the generator carrier 10 and on the receiving part 12 and that are at a distance from each other in the basic position get in contact with each other and trigger a horn signal.

The vehicle steering wheel according to FIGS. 1 and 2 is merely to be construed as an embodiment. Within the scope of the valid claims, numerous changes to details are possible. In particular, it should be mentioned that, in contrast to the example shown, it is also possible for the bearing projections 26 to be provided on the generator carrier 10 and for the grooves 32 to be provided on the receiving part 12. Mixed forms with bearing projections 26 and grooves 32 on the generator carrier 10 as well as on the receiving part 12 are likewise conceivable. By the same token, the number and position of the individual bearing projections 26 are variable, although a uniform, particularly symmetrical distribution has proven to be especially advantageous. In several embodiments of the vehicle steering wheel, the steering wheel axis A around which the vehicle steering wheel is rotated, coincides with the longitudinal axis B of the generator carrier 10 and the receiving part 12, whereas the axes A, B in other embodiments are offset with respect to each other but preferably parallel to one another (FIG. 2).

Thanks to the fact that the generator carrier 10 and the receiving part 12 are made of plastic, the vehicle steering wheel according to the invention can be produced especially cost-effectively. Moreover, the special axial guidance by means of bearing projections 26 and optional grooves 32 translates into an especially smooth and low-friction movement of the airbag module or generator carrier 10 in the receiving part 12 as well as into a small, uniform gap between the module cover 12 and an adjacent, stationary part of the steering wheel.

The invention claimed is:

1. A vehicle steering wheel being rotatable around a steering wheel axis (A), comprising
a steering wheel hub (38),
a receiving part (12) configured as a separate, prefabricated component,
an airbag module (13) with a generator carrier (10) and a module cover, said generator carrier (10) being inserted into said receiving part (12), and
a spring (46) in contact with the hub and between the hub and the generator carrier that pushes said generator carrier (10) into a basic position relative to said receiving part (12),
said receiving part (12) and said generator carrier (10) being made of plastic,
said generator carrier (10) and said receiving part (12) provide at least one contact element each, said contact elements being at a distance from each other in said basic position and being in contact with each other after an axial movement of said generator carrier (10) relative to said receiving part (12) against a force of said spring (46).

2. The vehicle steering wheel according to claim 1, wherein said generator carrier (10) is accommodated in and guided by said receiving part (12) so as to be axially movable.

3. The vehicle steering wheel according to claim 1, wherein said generator carrier (10) is configured as a pot-shaped module housing.

4. The vehicle steering wheel according to claim 1, wherein said generator carrier (10) has a base (18) to which a gas generator (20) is attached, said gas generator (20) extending through an opening (22) in said base (18).

5. The vehicle steering wheel according to claim 1, wherein said receiving part (12) is firmly joined to said steering wheel hub (38).

6. The vehicle steering wheel according to claim 5, wherein said receiving part (12) has a contact surface (40) which runs obliquely inwards in a direction to a base (30) of said receiving part (12), said receiving part (12) lying against a slanted counter-surface (42) of said steering wheel hub (38) via said contact surface (40).

7. The vehicle steering wheel according to claim 5, wherein said receiving part (12) is attached to said steering wheel hub (38) by attachment elements (36), said receiving part (12) having recesses (34) for receiving said attachment elements (36).

8. The vehicle steering wheel according to claim 7, wherein said recesses (34) are accessible from inside said receiving part (12).

9. A vehicle steering wheel being rotatable around a steering wheel axis (A), comprising
a steering wheel hub (38),
a receiving part (12),
an airbag module (13) with a generator carrier (10) and a module cover, said generator carrier (10) being inserted into said receiving part (12), and a spring (46) in contact with the hub and between the hub and the generator carrier that pushes said generator carrier (10) into a basic position relative to said receiving part (12), wherein said generator carrier (10) is accommodated in and guided by said receiving part (12) so as to be axially movable, at least one of said generator carrier (10) and said receiving part (12) having axially offset bearing projections (26), said bearing projections (26) adjoining at least one of said receiving part (12) and said generator carrier (10), and said bearing projections (26) providing an axial guidance, said generator carrier (10) and said receiving part (12) provide at least one contact element each, said contact elements being at a distance from each other in said basic position and being in contact with each other after an axial movement of said generator carrier (10) relative to said receiving part (12) against a force of said spring (46).

10. The vehicle steering wheel according to claim 9, wherein said bearing projections (26) are integrally formed onto at least one of said generator carrier (10) and said receiving part (12).

11. The vehicle steering wheel according to claim 9, wherein said bearing projections (26) are arranged in an area of axial ends (28) of at least one of said generator carrier (10) and said receiving part (12).

12. The vehicle steering wheel according to claim 9, wherein said bearing projections (26) are arranged so as to be distributed along one of an outer circumference of said generator carrier (10) and an inner circumference of said receiving part (12).

13. The vehicle steering wheel according to claim 9, wherein at least one of said generator carrier (10) and said receiving part (12) has at least three bearing projections (26) being offset relative to a circumferential direction.

14. The vehicle steering wheel according to claim 9, wherein said axial guidance of said generator carrier (10) in said receiving part (12) takes place exclusively by the help of said axially offset bearing projections (26).

15. The vehicle steering wheel according to claim 9, wherein axial grooves (32) are formed in one of said generator carrier (10) and said receiving part (12), said bearing projections (26) engaging in said grooves (32) and said bearing projections (26) being able to slide in said grooves (32).

16. The vehicle steering wheel according to claim 9, wherein said generator carrier (10) is configured as a pot-shaped module housing.

17. The vehicle steering wheel according to claim 9, wherein said generator carrier (10) has a base (18) to which a gas generator (20) is attached, said gas generator (20) extending through an opening (22) in said base (18).

18. The vehicle steering wheel according to claim 9, wherein said receiving part (12) and said generator carrier (10) are made of plastic.

19. The vehicle steering wheel according to claim 9, wherein said receiving part (12) is firmly joined to said steering wheel hub (38).

20. The vehicle steering wheel according to claim 19, wherein said receiving part (12) has a contact surface (40) which runs obliquely inwards in a direction to a base (30) of said receiving part (12), said receiving part (12) lying against a slanted counter-surface (42) of said steering wheel hub (38) via said contact surface (40).

21. The vehicle steering wheel according to claim 19, wherein said receiving part (12) is attached to said steering wheel hub (38) by attachment elements (36), said receiving part (12) having recesses (34) for receiving said attachment elements (36).

22. The vehicle steering wheel according to claim 21, wherein said recesses (34) are accessible from inside said receiving part (12).

23. A vehicle steering wheel being rotatable around a steering wheel axis (A), comprising a steering wheel hub (38), a receiving part (12) firmly joined to said steering wheel hub (38), and an airbag module (13) with a generator carrier (10), said generator carrier (10) being inserted into said receiving part (12), said generator carrier (10) being accommodated in and guided by said receiving part (12) so as to be axially movable, at least one of said generator carrier (10) and said receiving part (12) having axially offset bearing projections (26), said bearing projections (26) adjoining at least one of said receiving part (12) and said generator carrier (10), and said bearing projections (26) providing an axial guidance, said receiving part (12) being attached to said steering wheel hub (38) by attachment elements (36), said receiving part (12) having recesses (34) for receiving said attachment elements (36), said recesses (34) being accessible from inside said receiving part (12).

* * * * *